(12) United States Patent  
Okumura

(10) Patent No.: US 8,237,997 B2  
(45) Date of Patent: Aug. 7, 2012

(54) IMAGE READER AND IMAGE FORMING DEVICE

(75) Inventor: Ryuichi Okumura, Osaka (JP)

(73) Assignee: Kyocera Mita Corporation (JP)

( * ) Notice: Subject to any disclaimer, the term of this patent is extended or adjusted under 35 U.S.C. 154(b) by 473 days.

(21) Appl. No.: 12/535,195

(22) Filed: Aug. 4, 2009

(65) Prior Publication Data

US 2010/0157386 A1    Jun. 24, 2010

(30) Foreign Application Priority Data

Aug. 5, 2008  (JP) .................................. 2008-201792  
Jul. 29, 2009  (JP) .................................. 2009-176237

(51) Int. Cl.
*H04N 1/04* (2006.01)  
*H04N 1/38* (2006.01)

(52) U.S. Cl. ........ 358/496; 358/488; 358/463; 358/465; 358/461; 358/443; 358/448

(58) Field of Classification Search .................. 358/488, 358/496, 498, 463, 465, 466, 461, 474, 443, 358/448; 382/275, 274, 312, 318, 319  
See application file for complete search history.

(56) References Cited

U.S. PATENT DOCUMENTS

| | | | | |
|---|---|---|---|---|
| 6,728,418 | B1* | 4/2004 | Kumagai et al. | 382/275 |
| 6,839,153 | B1* | 1/2005 | Shimizu | 358/3.21 |
| 7,839,545 | B2* | 11/2010 | Saka et al. | 358/514 |
| 2003/0090742 | A1* | 5/2003 | Fukuda et al. | 358/448 |
| 2007/0291324 | A1* | 12/2007 | Kamei et al. | 358/474 |
| 2011/0181919 | A1* | 7/2011 | Okutsu | 358/448 |
| 2011/0242628 | A1* | 10/2011 | Morikawa | 358/504 |

FOREIGN PATENT DOCUMENTS

JP    10-294870    11/1998

* cited by examiner

*Primary Examiner* — Cheukfan Lee  
(74) *Attorney, Agent, or Firm* — Gerald E. Hespos; Michael J. Porco

(57) ABSTRACT

An image reader includes: an average calculation unit which calculates an average $D_{AV}$ of pixel values of pixels existing in an area corresponding to a striped image in a document image read by a scanning unit; a judgment unit which judges whether the average $D_{AV}$ is a value between judgment reference values $D_L$ and $D_H$ where ($D_L < D_{AV} < D_H$); and a correction unit which executes replacement processing to replace a pixel value of each pixel in an area corresponding to the striped image with to a pixel value calculated based on a pixel value of a peripheral pixel if $D_L < D_{AV} < D_H$ is not satisfied and maintains the pixel value of each pixel in the area corresponding to the striped image without performing the replacement processing if $D_L < D_{AV} < D_H$ is satisfied.

7 Claims, 7 Drawing Sheets

$$D_{AV} = \frac{D_1 + D_2 + \cdots + D_{n-1} + D_n}{n}$$

IMAGE READER AND IMAGE FORMING DEVICE

BACKGROUND OF THE INVENTION

1. Field of the Invention

The present invention relates to a sheet-through type image reader which, while transporting a read-target document so as to move on one side of a main surface of a transparent plate, reads the image of the document from the other side of the main surface of the transparent plate, and an image forming device having this image reader.

2. Description of the Related Art

When an image of a document is read using a sheet-through type image reader and printed by a printer, or loaded to a computer, such as a personal computer, and is displayed on a screen, a striped image along the sub-scanning direction may appear in the image. This is normally caused by foreign substances, such as dirt, dust or paper dust from the document being transported, or by a scratch on the glass. The striped image appears as a black strip on the white background portion, or as a white strip on the image portion, and visually stands out, therefore removal of such a striped image is desired for an image reader which is demanded to create an image faithful to the document.

An example of a technology aiming at suppressing the generation of this striped image is disclosed in Japanese Patent Application Laid-Open No. H10-294870, where if a pixel position is specified as a pixel of a dirt component, an image correction unit 10 applies a pixel matrix in which the pixel position is a target pixel RT, extracts pixels which are not specified as a pixel of the dirt component (that is, pixels with a normal value) included in the pixel matrix, calculates an average value of the pixels with a normal value, and outputs the calculated average value as a digital image signal DAc after correcting the target pixel RT.

SUMMARY OF THE INVENTION

The present invention further improves the abovementioned prior art.

In other words, the present invention is an image reader including: a document transport unit which transports a document; a reading unit which executes read operation in a main-scanning direction at a predetermined reading position, and is capable of reading an image of a document which passes the reading position in a sub-scanning direction during transportation by the document transport unit; a striped image detection unit which detects a striped image generated by a presence of a foreign substance adhering in the reading position, based on the image acquired in the reading operation by the reading unit; an average calculation unit which calculates an average of pixel values of pixels that constitutes the image of the document read by the reading unit, the pixels being at positions corresponding to the striped image detected by the striped image detection unit; a judgment unit which judges whether the average calculated by the average calculation unit is in a predetermined range; and a correction unit which performs a first correction processing to replace a pixel value of each pixel that constitutes the read image of the document by the reading unit, and is located at a position corresponding to the striped image, with a pixel value determined by a pixel value of a pixel around the pixel or with a predetermined pixel value, when the judgment unit judges that the average is outside the predetermined range, and performs a second correction processing to correct a pixel value of each that constitutes the read image of the document by the reading unit and is located at a position corresponding to the striped image by using the pixel value of this pixel, when the judgment unit judges that the average is within the predetermined range.

DETAILED DESCRIPTION OF THE PREFERRED EMBODIMENTS

Figure 1:
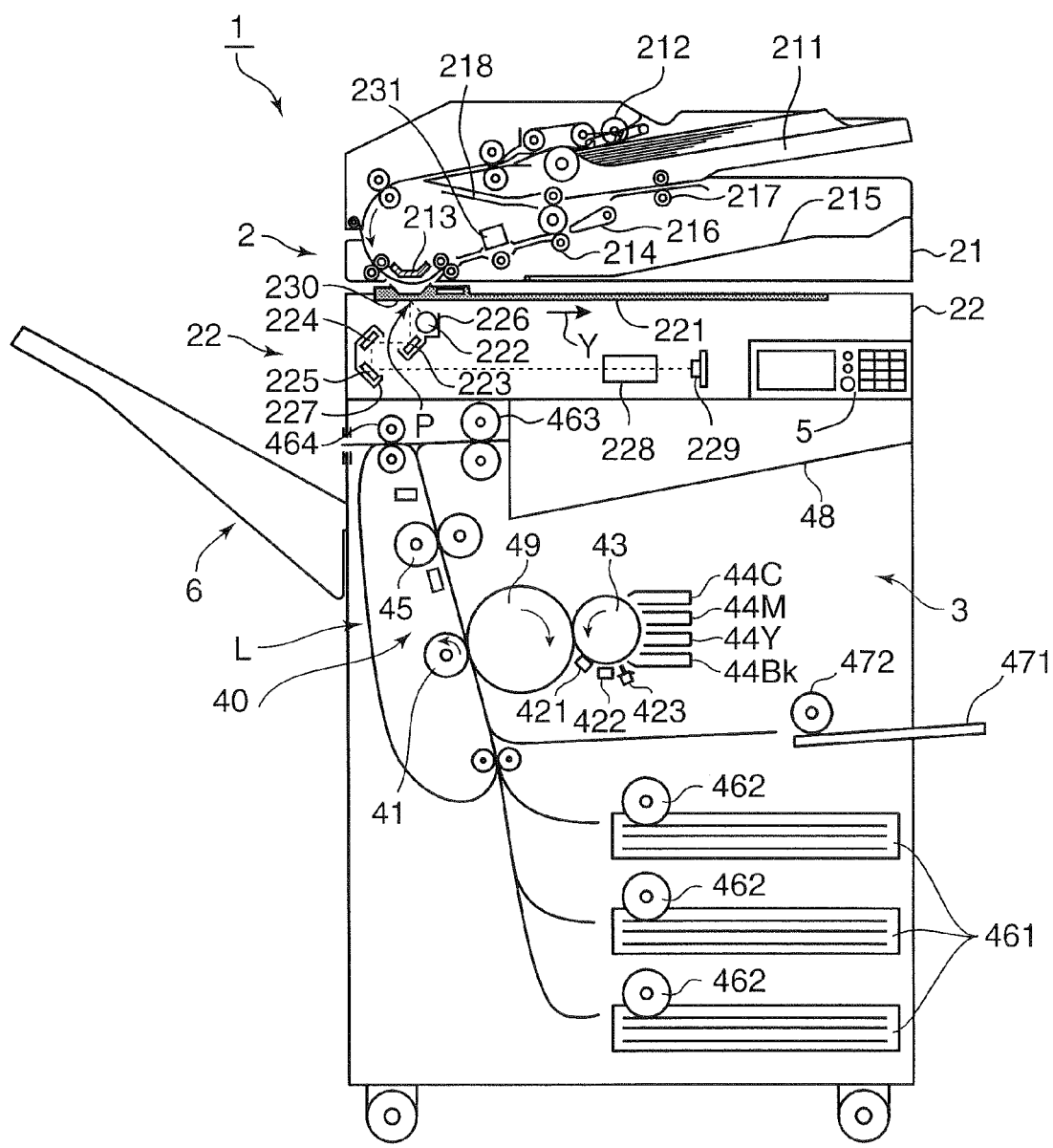
FIG. 1 is a vertical side view depicting an internal configuration of a composite machine.

Embodiments of the image reader and image forming device according to the present invention will now be described with reference to the drawings. In the following embodiments, a composite machine having a color copier, scanner, facsimile and printer functions will be described as an example of the image reader and image forming device of the present invention. FIG. 1 is a vertical sectional view depicting an internal configuration of the composite machine.

The composite machine 1 is comprised of an image reading unit 2 and a device main unit 3. The image reading unit 2 has a document feed unit 21, scanning unit 22, CIS 231, operation unit 5, and later mentioned reversing mechanism and control unit 61 (see FIG. 2). The document feed unit 21 has an ADF (Automatic Document Feeder), and has a document tray 211, pickup roller 212, platen 213, paper discharge roller 214 and paper discharge tray 215. A read-target document is placed in the document tray 211. The document placed in the document tray 211 is loaded by the pickup roller 212 one sheet at a time, and is sequentially transported to the platen 213 via a gap. The document which passed through the platen 213 is sequentially discharged into the paper discharge tray 215 by the paper discharge roller 214.

Out of the positions facing the circumferential surface of the platen 213, a timing sensor for detecting paper, which is not illustrated, is disposed at a predetermined position closer than the later mentioned reading position P in the document transporting direction, and document transporting timing to the reading position P is measured based on the output signal of this timing sensor. This timing sensor is constructed by a photo-interruptor, for example.

The scanner unit 22 is for optically reading the image of the document, then generating the image. The scanner unit 22 has a glass 221, light source 222, first mirror 223, second mirror 224, third mirror 225, first carriage 226, second carriage 227, image formation lens 228, and CCD (Charge Coupled Device) 229. For this scanner unit 22, a white fluorescent lamp, such as a cold cathode fluorescent tube, is used for the light source 222, and the light is guided from the document to the CCD 229 by the first mirror 223, second mirror 224, third mirror 225, first carriage 226, second carriage 227 and image formation lens 228. Since the scanner unit 22 is constructed as the light source 222 using a white fluorescent lamp, such as a cold cathode fluorescent tube, color reproducibility is better than the later mentioned CIS 231, which uses three color LEDs for the light source.

An document is manually placed on the glass 221 by the user when the document is read without using the document feed unit 21. The light source 222 and first mirror 223 are supported by the first carriage 226, and the second mirror 224 and third mirror 225 are supported by the second carriage 227.

Available document reading methods for the image reading unit 2 are a flatbed reading mode in which the scanner unit 22 reads the document placed on the glass 221, and an ADF reading mode in which the document is loaded by the document feed unit 21 (ADF) and is read in the middle of transporting the document.

In the flatbed reading mode, the light source 222 irradiates onto the document placed on the glass 221, a reflected light for one line in the main-scanning direction is reflected in the sequence of the first mirror 223, second mirror 224 and third mirror 225, and enters the image formation lens 228. The light which entered the image formation lens 228 forms an image on the light receive surface of the CCD 229. The CCD 229 is a one-dimensional image sensor, and simultaneously processes one line of an image of the document. The first carriage 226 and second carriage 227 can move in a direction perpendicular to the main-scanning direction (sub-scanning direction, arrow Y direction), and when one line of reading ends, the first carriage 226 and second carriage 227 move in the sub-scanning direction, and the next line is read.

In the ADF reading mode, the document feed unit 21 loads the document placed in the document tray 211 by a pickup roller 212 one sheet at a time. At this time, the first carriage 226 and the second carriage 227 are placed at a predetermined reading position P below the reading window 230. When the document is transported by the document feed unit 21 and passes through on the reading window 230 created on the transport path from the platen 213 to the paper discharge tray 215, the light source 222 irradiates onto the document, and the reflected light for one line in the main-scanning direction sequentially reflects onto the first mirror 223, second mirror 224 and third mirror 225, and enters the image formation lens 228. The light which entered the image formation lens 228 forms an image on the light receive surface of the CCD 229. Then the document is transported by the document feed unit 21 and the next line is read.

The document feed unit 21 has a document reversing mechanism, which has a switching guide 216, reversing roller 217 and reverse transport path 218. This document reversing mechanism flips the document over of which front surface is read by a first ADF reading, and transports the flipped document back to the reading window 230, whereby the rear surface is read by the CCD 229. This document reversing mechanism operates only in double-side reading, and does not operate in single-side reading. After single-side reading or after reading the rear surface in double-side reading, the switching guide 216 is switched to up, and the document which passed through the platen 213 is discharged to the paper discharge tray 215 by the paper discharge roller 214. After the front side is read in double-side reading, the switching guide 216 is switched to down, and the document which passed through the platen 213 is transported to the reverse transport path 218 by the reversing roller 217. Then the switching guide 216 is switched to up, and the reversing roller 217 rotates in reverse so as to feed the document back to the platen 213. Hereafter the mode of having the document reversing mechanism read both sides of the document is called "reversal double-side reading mode".

In ADF reading mode, the image reading unit 2 of the present embodiment has the CCD 229 (scanner unit 22) read the front face of the document in the middle of transporting the document, as mentioned above, and substantially at the same time (substantially in parallel with the reading), CIS 231 can have the CIS 231 read the rear face of the document. In this case, the front face of the document, transported from the document tray 211 by the document paper feed unit 21, is read by the CCD 229 while passing through the reading window 230, and the rear face is read while passing through the area where the CIS 231 is disposed. In the CIS 231, a three-color LED, R, G and B, is used for the light source. By using the CCD 229 and CIS 231 like this, both the front and rear faces of the document can be read by one document transport operation (one pass) by the document paper feed unit 21 from the document tray 211 to the paper discharge tray 215. The mode of having the CCD 229 and CIS 231 read both sides of the document is hereafter called "simultaneous double-side reading mode".

The reversal double-side reading mode and the simultaneous double-side reading mode are provided as reading modes when both sides of the document are read using the ADF reading mode. The reversal double-side reading mode is used to make the image quality of the printed image on both sides consistent, whereas the simultaneous double-side reading mode is used to give priority to decreasing the reading time even if the image quality of the printed image between the front and rear sides is different. The composite machine 1 of the present embodiment is initially set to simultaneous double-side reading mode, and if an image formation instruction is input without setting a mode for the reading mode, the image of the document is read in simultaneous double-side reading mode.

The composite machine 1 has the device main unit 3 and a stack tray 6, which is disposed at the left side of the device main unit 3. The device main unit 3 has a plurality of paper feed cassettes 461, a paper feed roller 462, which feeds a recording paper out from the paper feed cassette 461 one sheet at a time, and transports it to an image forming unit 40, and the image forming unit 40, which forms an image on the recording paper transported from the paper feed cassette 461. The device main unit 3 also has a paper feed tray 471, and a feed roller 472, which feeds the document placed in the paper feed tray 471 toward the image forming unit 40 one sheet at a time.

The image forming unit 40 has a charge removal device 421 which removes residual charges from the surface of a photosensitive drum 43, a charge device 422 which charges the surface of the photosensitive drum 43 after charge removal, an exposure device 423 which exposes the surface of the photosensitive drum 43 by outputting a laser beam based on the image acquired by the scanner unit 22, to form an electrostatic latent image on the surface of the photosensitive drum 43 for development, development devices 44Bk, 44Y, 44M and 44C, which form toner images of each color, cyan (C), magenta (M), yellow (Y) and black (Bk), on the photosensitive drum 43 based on the electrostatic latent image, a transfer drum 49 on which the toner images of each color formed on the photosensitive drum 43 are transferred and overlayed, a transfer device 41 which transfers the toner image on the transfer drum 49 to the paper, and a fixing device 45 which fixes the toner image on the paper by heating the paper on which the toner image is transferred. Toner for each color, cyan, magenta, yellow and black, is supplied from each toner supply container (toner cartridge), which is not illustrated. Transport rollers 463 and 464, for transporting the recording paper which passed the image forming unit 40 to the stack tray 6 or the discharge tray 48, are also disposed.

In a case of forming images on both sides of the recording paper, an image is formed on one side of the recording paper by the image forming unit 40, then this recording paper is nipped by the transport roller 463 at the discharge tray 48 side. In this state, the transport roller 463 is reversed to switch back the recording paper, the recording paper is then fed to the paper transport path L and is transported again to the upstream area of the image forming unit 40, then after an image is formed on the other side by the image forming unit 40, the recording paper is discharged to the stack tray 6 or the discharge tray 48.

In the front area of the device main unit 3, a display unit 51, for a user to visually recognize the operation screen and various messages, and an operation unit 5, which has operation buttons for inputting various operation instructions, are disposed. This operation unit 5 has a display unit 51, touch panel 52, numeric key group 53, various operation buttons 54 to 57, and function select buttons 58. The display unit 51 is constructed by an LCD (Liquid Crystal Display) or ELD (Electronic Luminescent Display) or the like, and displays the operation guide screen for the user, including the paper size selection, magnification selection and density selection. This display unit 51 is integrated with the touch panel 52. The touch panel 52 detects a position touched by the user, and outputs a detection signal which indicates this touch position to the control unit 61.

The numeric key group 53 is used, for example, to input a number of copies when the copy function of the composite machine 1 is operated, and to input the telephone number of the transmission destination when the facsimile function is operated. The power saving button 54 is a button to set the composite machine 1 to power saving (low power) mode. A start button 55 is a button to start such operations as the copy operation and scanner operation, and a stop/clear button 56 is a button to stop the copy operation and scanner operation, and to cancel the input operation. The reset button 57 is a button to set the display of the display unit 51 and various settings to an initial state or standard operation state. The function select button 58 is a button to set the copy function, printer function, scanner function and facsimile function.

Figure 2:
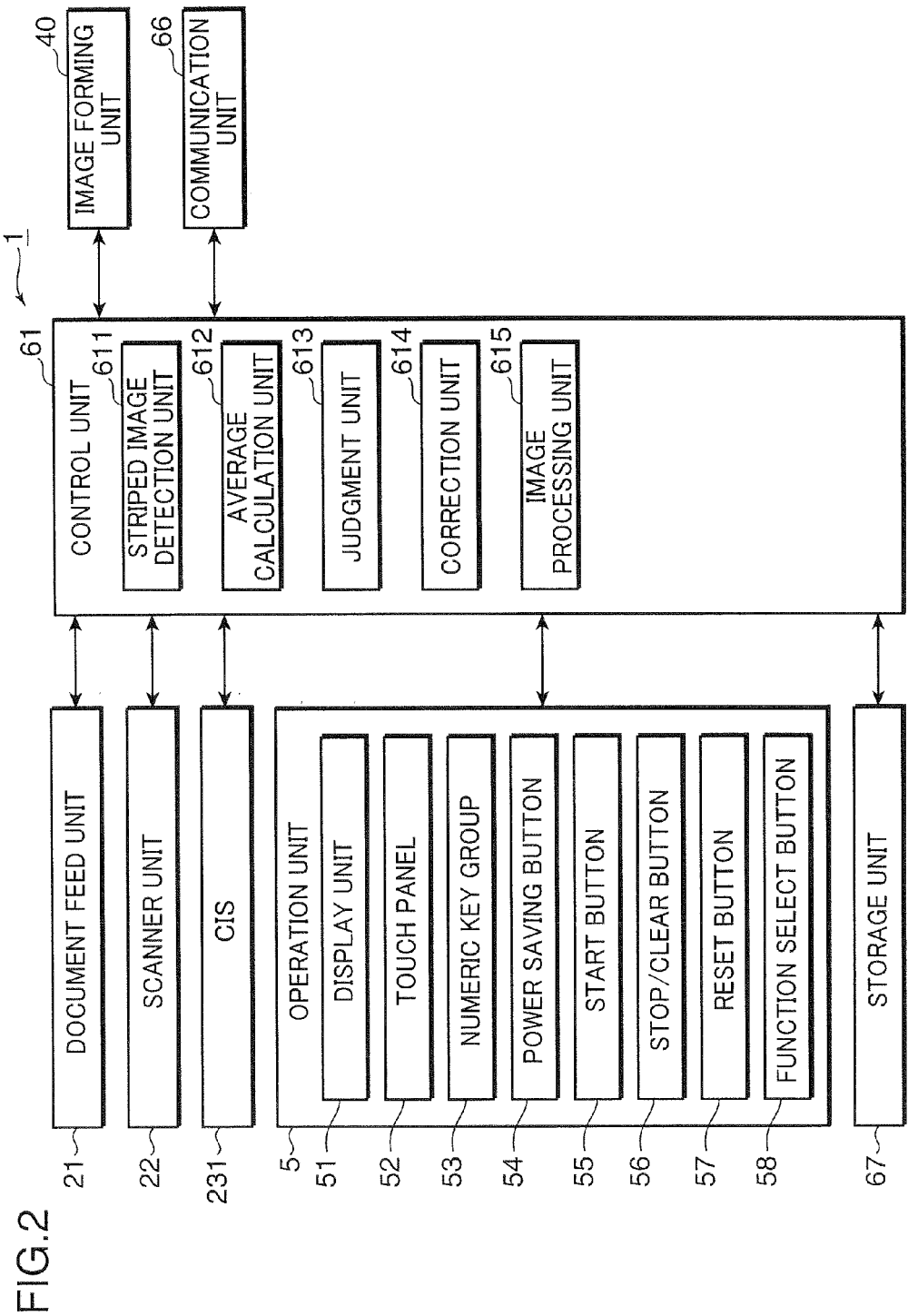
FIG. 2 is a block diagram depicting an electric configuration of a composite machine.

FIG. 2 is a block diagram depicting an electric configuration of the composite machine 1. A composing element, the same as shown in FIG. 1, is denoted with a same reference symbol, for which description is omitted. The composite machine 1 is comprised of a document feed unit 21, scanner unit 22, CIS 231, operation unit 5, image forming unit 40, communication unit 66, storage unit 67 and control unit 61.

The document supply unit 21 automatically loads the document placed in the document tray 211 when the document is copied or scanned in the ADF reading mode, and transports the document so as to be read by the CCD 229 and CIS 231. The operation unit 5 corresponds to the operation unit 5 shown in FIG. 1. The scanner unit 22 and CIS 231 correspond to the scanner unit 22 and CIS 231 shown in FIG. 1.

The operation unit 5 is used by the user to perform operations related to the copy function, printer function, facsimile function and scanner function, and provides operation instructions (commands) by the user to the control unit 61. The operation unit 5 includes a display unit 51 having such a unit as a touch panel, and the start button 55 and numeric keys 53 for the user to input various instructions, such as a copy execution start instruction and facsimile transmission start instruction.

The image forming unit 40 forms an image based on an image acquired by the scanner unit 22 or CIS 231, or an image transferred from a personal computer or facsimile via the communication unit 66, on the recording paper. The communication unit 66 transmits/receives various data to/from external devices, such as a computer and facsimile, connected via a network, using a network interface, which is not illustrated.

The storage unit 67 has a storage unit for storing images acquired by the read operation of the scanner unit 22 and CIS 231, and images processed by the later mentioned control unit 61, and a storage unit which stores destination names and facsimile numbers for speed dialing registration in facsimile communication, and the IP addresses of the transmission destination when the composite machine 1 is used as a network scanner, in advance.

The control unit 61 controls the operation of the entire composite machine 1, and is comprised of a CPU, RAM and ROM. The document feed unit 21, scanner unit 22, CIS 231, operation unit 5, image processing unit 615, image forming unit 40 and communication unit 66 are operated under control of the control unit 61. The control unit 61 systematically controls the composite machine 1 by executing processing based on the operation control program stored in ROM, which is not illustrated, or the storage unit 67, according to various instruction signals which the user inputs into the operation unit 5, outputting instruction signals to each functional unit, and transferring data.

Figure 3:
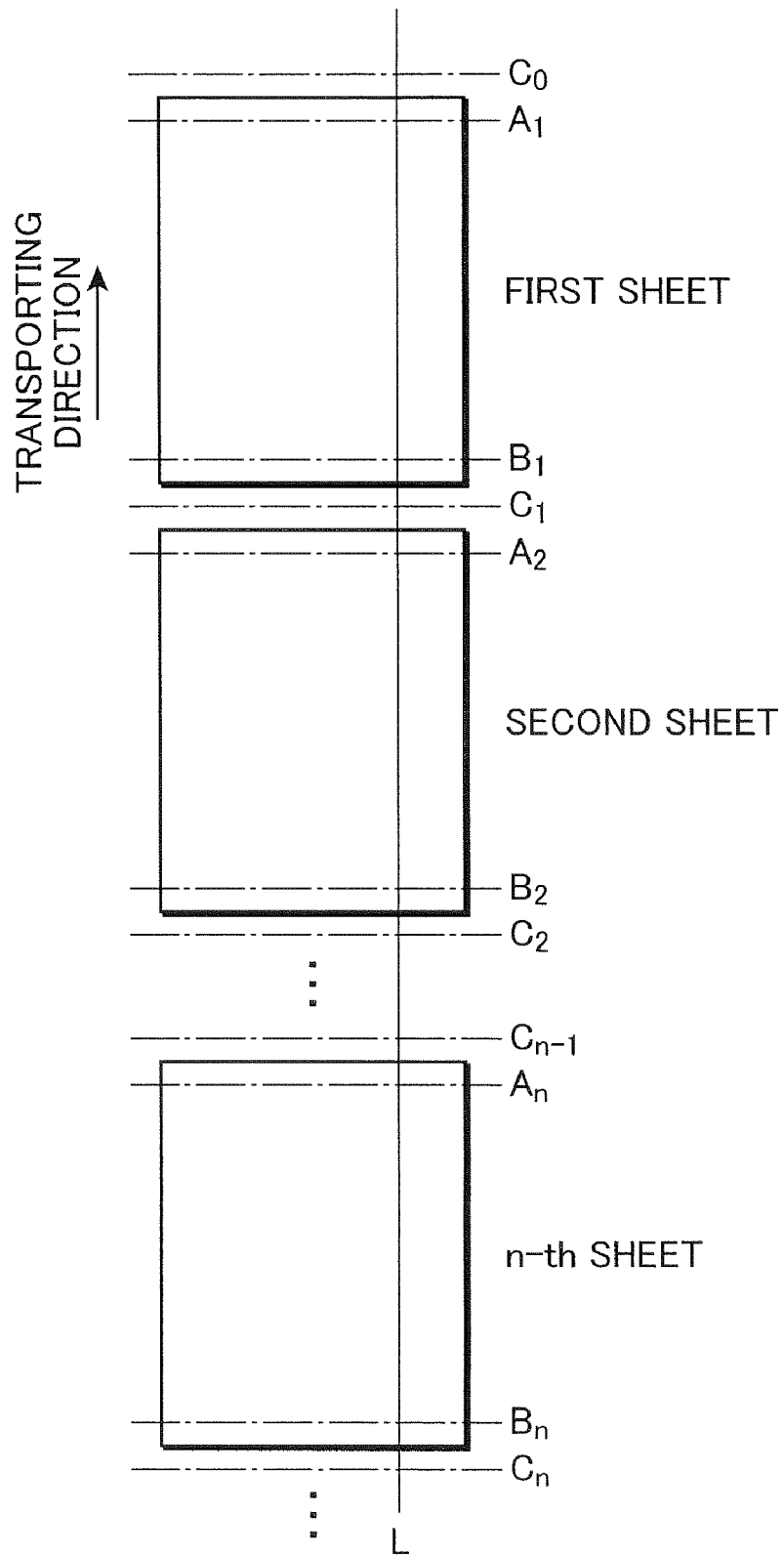
FIG. 3 is a diagram depicting a lined up state of each document to be sequentially transported to the reading position by the document feed unit, assuming that the document transport path to the reading position by the document feed unit is substantially a straight line.

In the composite machine 1 having this configuration, such foreign substances as correction solution, ink or paper dust may adhere to the reading window 230. If foreign substances adhere to the reading window 230 when the image reading unit 4 is executing the read operation of a document being transported by the document transport unit 5 in ADF mode, a striped image that extends in the sub-scanning direction (line L in FIG. 3: hereafter called "striped image") may be formed in the main-scanning direction corresponding to the pixel positions of the pixels of an image acquired by the scanner unit 22. The composite machine 1 has a function to remove such striped images by image processing. FIG. 3 is an image depicting a lineup state of each document which is sequentially transported to the reading position P by the document feed unit 5, assuming that the document transport path to the reading position P by the document feed unit 5 is substantially a straight line.

As FIG. 2 shows, the control unit 61 has a striped image detection unit 611, an average calculation unit 612, a judgment unit 613, a correction unit 614 and an image processing unit 615. Here an issue is a striped image, which is generated due to a foreign substance adhering to the reading window 230, and an image, which is output from the scanner unit 22, is mainly described.

The striped image detection unit 611 has the image forming unit 40 execute normal image reading operation (image reading operation of a document), and a reading operation, at a timing before a predetermined position (gap) between this document and the previous (or next) document which is transported, reaches the abovementioned reading position P. In other words, as FIG. 3 shows, the striped image detection unit 611 has the scanner unit 22 execute the normal image reading operation for the nth (n is 1 or higher integer) document. Then the striped image detection unit 611 has the scanner unit 22 execute the reading operation in a predetermined position $C_{n-1}$ between the rear end of the (n−1)th document and the front end of the nth document (or a predetermined position $C_n$ between the rear end of the nth document and the front end of the (n+1)th document. in other words, between the documents). Then the striped image detection unit 611 detects whether the image generated by the foreign substance (hereafter "striped image") is included in the image data acquired by the reading operation between the documents.

As mentioned above, the surface facing the reading windows 230 of the platen 213 is white only, so in the reading operation executed at a timing when the abovementioned position $C_{n-1}$ (or $C_n$) passes the reading position P, light is irradiated onto the white surface by the exposure lamp 20 of the document reading unit 4.

Therefore if a foreign substance does not exist on the reading windows 230 at the timing when the position $C_{n-1}$ passes the reading position P, one line of an image in the main-scanning direction, which is acquired by the scanner unit 22 at the abovementioned timing, has a pixel data having a relatively high pixel value corresponding to the white, evenly in the main-scanning direction.

If a foreign substance exists on the reading window 230 at the timing when the position $C_{n-1}$ passes the reading position P, one line of an image in the main-scanning direction acquired by the scanner unit 22 at this timing is a pixel data having relatively high pixel values in which pixel data having lower pixel values generated due to the foreign substance is included.

Based on this, the striped image detection unit 611 executes processing to detect the striped image generated due to the foreign substance. In other words, according to the present embodiment, the striped image detection unit 611 determines whether pixel data of which pixel value is lower than a predetermined threshold is included in pixel data having relatively high pixel values, for the image acquired by the scanner unit 22 based on the reading operation between the documents at a timing when the position $C_{n-1}$ passes the reading position P, if the pixel data of which pixel value is lower than the threshold is included in the pixel data having relatively high pixel values, then the striped image detection unit 611 detects this pixel data of which pixel value is lower than the threshold as the striped image.

Figure 4:
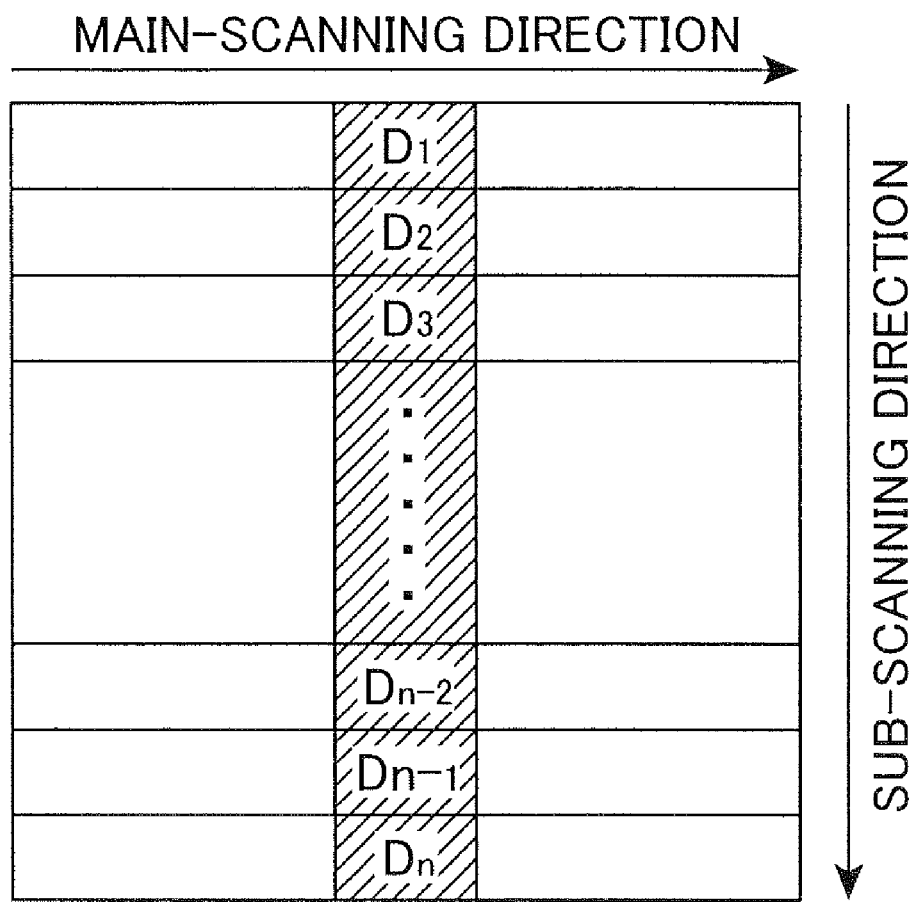
FIG. 4 is a diagram for describing a method for calculating an average of pixel values of pixels located in an area corresponding to a striped image.

When the striped image is detected by the striped image detection unit 611, the average calculation unit 612 calculates the average $D_{AV}$ of the pixel values of pixels at positions corresponding to the striped image (positions in the main-scanning direction corresponding to the striped image in each main-scanning line), among the pixels constituting the image of the document read by the scanner unit 22. It is assumed that the position of the striped image in the main-scanning direction detected by the striped image detection unit 611 is in the hatched portion shown in FIG. 4, for example, in the image of each main-scanning line of the document image read by the scanner unit 22, and the pixel values of the pixels in this portion are $D_1, D_2, D_3, \ldots D_{n-2}, D_{n-1}, D_n$ sequentially from the top of the main-scanning line. At this time, the average calculation unit 612 calculates the average $D_{AV}$ of the pixel values of the pixel group located at the positions corresponding to the striped image based on the expression $(D_1+D_2+D_3+ \ldots +D_{n-2}+D_{n-1}+D_n)/n$.

The judgment unit 613 judges whether the average $D_{AV}$ calculated by the average calculation unit 612 is a value between the predetermined judgment reference values $D_L$ and $D_H$ ($D_L<D_H$), where ($D_L<D_{AV}<D_H$).

If the average $D_{AV}$ does not satisfy $D_L<D_{AV}<D_H$, that is, if the pixel values of the image in the striped image area are extremely high or extremely low, the probability of the image of the document appearing in the area corresponding to the striped image is null or low. Based on this, the correction unit 614 performs replacement processing of the pixel values using the pixel values of peripheral pixels if the average $D_{AV}$ does not satisfy $D_L<D_{AV}<D_H$, and outputs the image after the replacement processing to the image processing unit 615. Processing that can be used for this replacement processing is a known processing, whereby an average of pixel groups positioned at a peripheral area (e.g. predetermined left and right areas close to a pixel in the main-scanning direction) of a pixel in an area corresponding to the striped image (position corresponding to the striped image in each scanning line, in the main-scanning direction) is calculated, and this average is used as the pixel values of the pixels in the area corresponding to the striped image instead of the pixel values of these pixels (replacement). Replacement processing is not limited to this, and the pixel values of pixels in an area corresponding to the striped area may be replaced with a predetermined pixel value, for example. These replacement processings are examples of a first correction processing.

If the average $D_{AV}$ satisfies $D_L<D_{AV}<D_H$, on the other hand, it is highly probable that the image of the document appears in the area corresponding to the striped image. Based on this, if the average $D_{AV}$ satisfies $D_L<D_{AV}<D_H$, the correction unit 614 maintains a pixel value of each pixel in the area corresponding to the striped image without performing replacement processing, and this image is output to the image processing unit 615. This replacement processing is an example of a second correction processing.

The image processing unit 615 performs various image processings on the image. For example, the image processing unit 615 performs such correction processing as shading correction, level correction, gamma correction, chromatic aberration correction, MTF (Modulation Transfer Function) correction and scanner color correction, and such image processing as image compression or decompressing processing, and enlargement or reduction processing for the images which are output from the correction unit 614, and the images which are transferred from a networked personal computer and facsimile device connected through a public line or the like via the communication unit 66.

Figure 5:
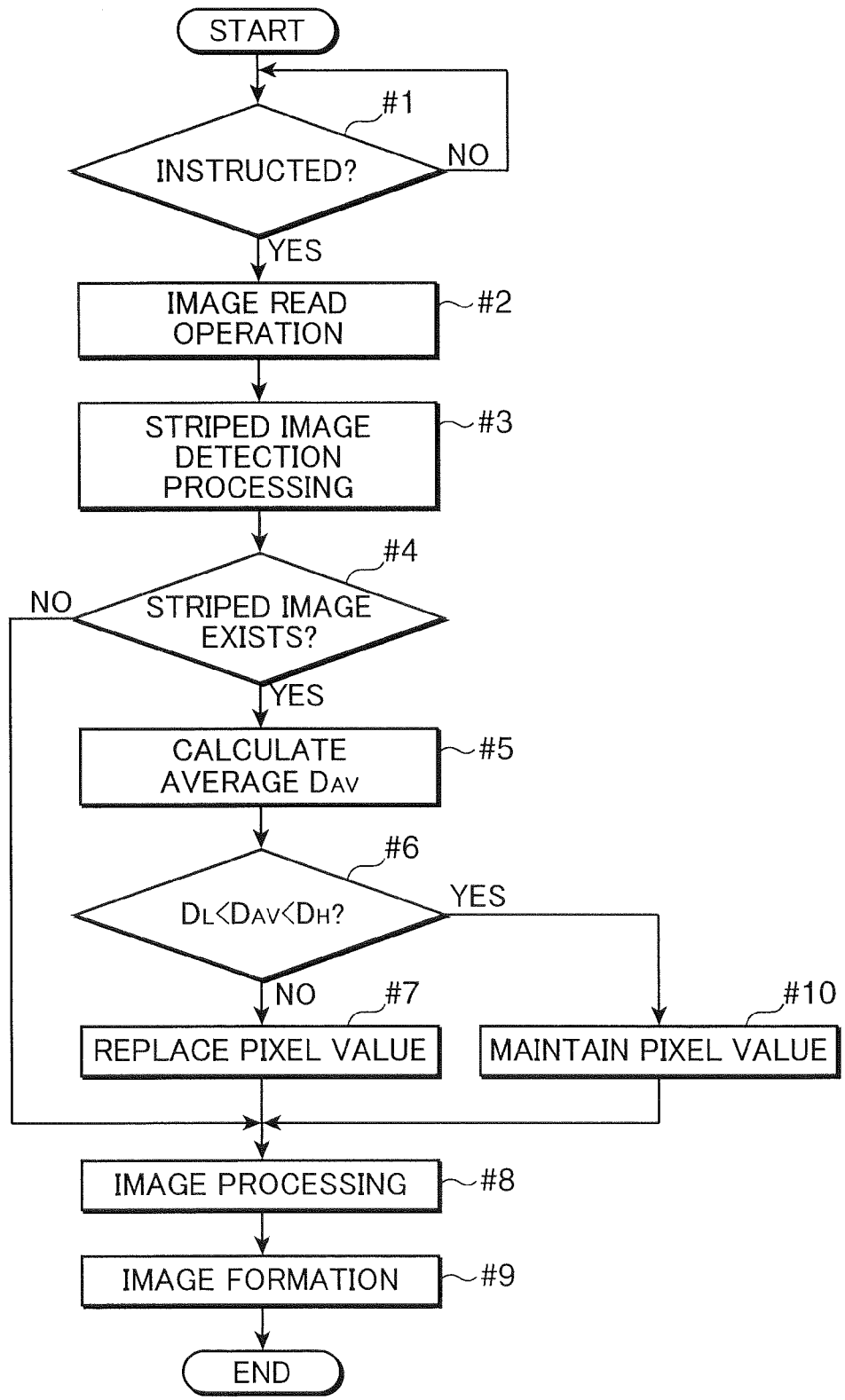
FIG. 5 is a flow chart depicting a striped image removal processing by a control unit.

FIG. 5 is a flow chart depicting a striped image removal processing by the control unit 61.

As FIG. 5 shows, when an instruction to execute the image forming operation is output (YES in step #1), the control unit 61 has the scanner unit 22 execute the reading operation for both the image between the documents and the images of the documents (step #2). The striped image detection unit 611 executes processing to detect the striped image in the image acquired by the image reading operation between documents (step #3).

If the striped image is not detected by the striped image detection unit 611 as the result (NO in step #4), then no replacement processing described above by the correction unit 614 is executed for the image of the document read by the scanner unit 22, and only the abovementioned image processing by the image processing unit 614 is performed (step #8). The image forming unit 40 executes the image forming operation on the recording paper based on the image after image processing by the image processing unit 614 (step #9).

When the striped image is detected by the striped image detection unit 611 (YES in step #4), the average calculation unit 612 calculates the abovementioned average $D_{AV}$ of the pixel values for each pixel in the area corresponding to the striped image in the image of the document read by the scanner unit 22 (step #5).

The judgment unit 613 judges whether the average value $D_{AV}$ calculated by the average calculation unit 612 is a value between predetermined judgment reference values $D_L$ and $D_H$ ($D_L<D_H$), where ($D_L<D_{AV}<D_H$) (step #6).

If the judgment unit 613 judges that the average value $D_{AV}$ does not satisfy $D_L<D_{AV}<D_H$ (NO in step #6), the correction unit 614 executes the abovementioned replacement processing for the pixel values using the pixel values of the peripheral pixels (first correction processing) for the pixels of the image read by the scanner unit 22 and located in the area corresponding to the striped image, and outputs the image after this replacement processing to the image processing unit 615 (step #7).

If the average $D_{AV}$ satisfies $D_L<D_{AV}<D_H$ (YES in step #6), the correction unit 614 maintains the pixel value of each pixel of the image located in the area corresponding to the striped image (step #10), and outputs this image to the image processing unit 615. In other words, the correction unit 614 executes the second correction processing if the average $D_{AV}$ satisfies $D_L<D_{AV}<D_H$.

After the processing in step #7, the image processing unit 615 executes the image processing for the image which was output from the correction unit 614 (step #8), and the image forming unit 40 executes the image forming operation on the recording paper based on the image after the image processing by the image processing unit 615 (step #9).

As described above, according to the present embodiment, in the case when the striped image is detected in the read image, if an average of the pixel value of each pixel constituting an image in an area corresponding to the striped image in the document image is within a predetermined range, it is highly probable that the image formed on the read target document appears in an image in an area corresponding to the striped image (pixel of an image in the area corresponding to the striped image reflects the information on the image formed on the document), so based on this, the pixel value of each pixel is maintained for each pixel constituting the image in the area corresponding to the striped image in the document image, without performing replacement processing using pixel values of peripheral pixels. Thereby damaging the quality of an image by performing replacement processing, ignoring the appearance of an image formed on the document in an area corresponding to the striped image in the document image, can be prevented.

In the present invention, the following variant form can be used, instead of the above embodiment, or in addition to the above embodiment.

According to the above embodiment, in the case when the average $D_{AV}$ of the pixel values of a pixel group constituting the striped image satisfies $D_L<D_{AV}<D_H$, a method of maintaining the pixel value of each pixel and outputting this image to the image processing unit 615, without executing replacement processing, was used as an example of the second correction processing, but instead of this mode, correction processing by using a predetermined correction expression on the pixel value of each pixel in the area corresponding to the striped image, such as adding a predetermined value to the pixel value of each pixel in the area corresponding to the striped image, or multiplying the pixel value of each pixel in the area corresponding to the striped image by a predetermined coefficient, may be used.

Figure 6A:
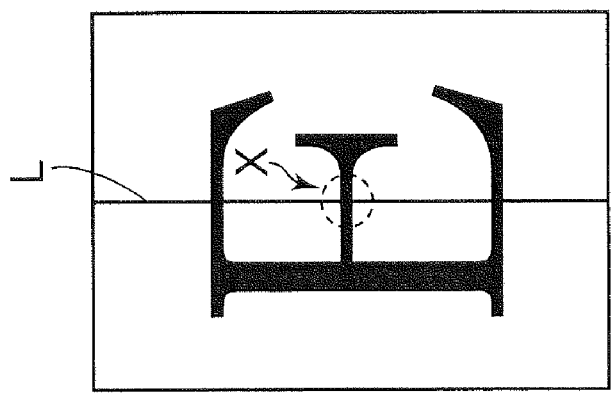
FIGS. 6 A, B and C are diagrams depicting a variant form.
Figure 6B:
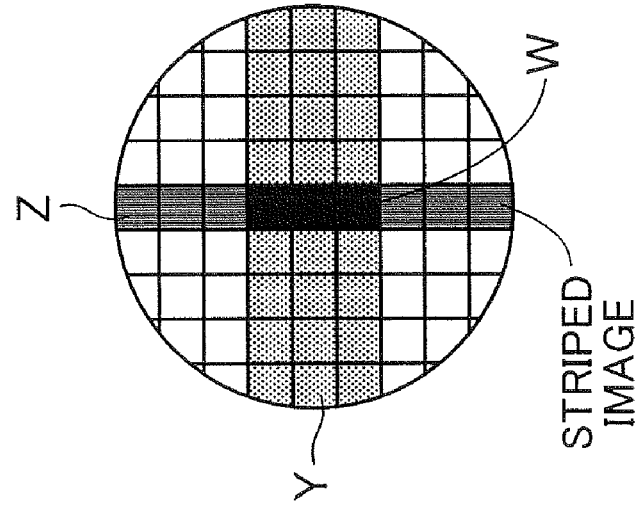

As an example of the first correction processing, the following correction processing is also possible. For example, it is assumed that an image of a document acquired by the read operation of the scanner unit 22 includes a striped image L, as shown in FIG. 6A. FIG. 6B is an enlarged view of the portion indicated by the arrow X in FIG. 6A.

Figure 6C:
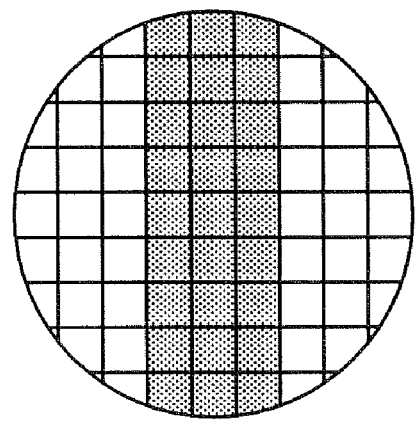

For example, when the determination in the step #6 is "NO," and the striped image is superimposed on the halftone image in the image of the document acquired by the read operation of the scanner unit 22 as shown in FIG. 6B, if the pixel value W of the image in the superimposed portion is a value corresponding to a sum of the pixel value Y of the halftone image and the pixel value Z of the striped image, then correction processing in which the correction unit 614 calculates an additional value, which is added to the pixel value Z to make the pixel value Z of the pixel located in the area corresponding to the striped image be the pixel value corresponding to white, as a correction value, and add this correction value to the pixel value W of each pixel in the superimposed portion, may be adopted to remove the striped image as shown in FIG. 6C.

Figure 7:
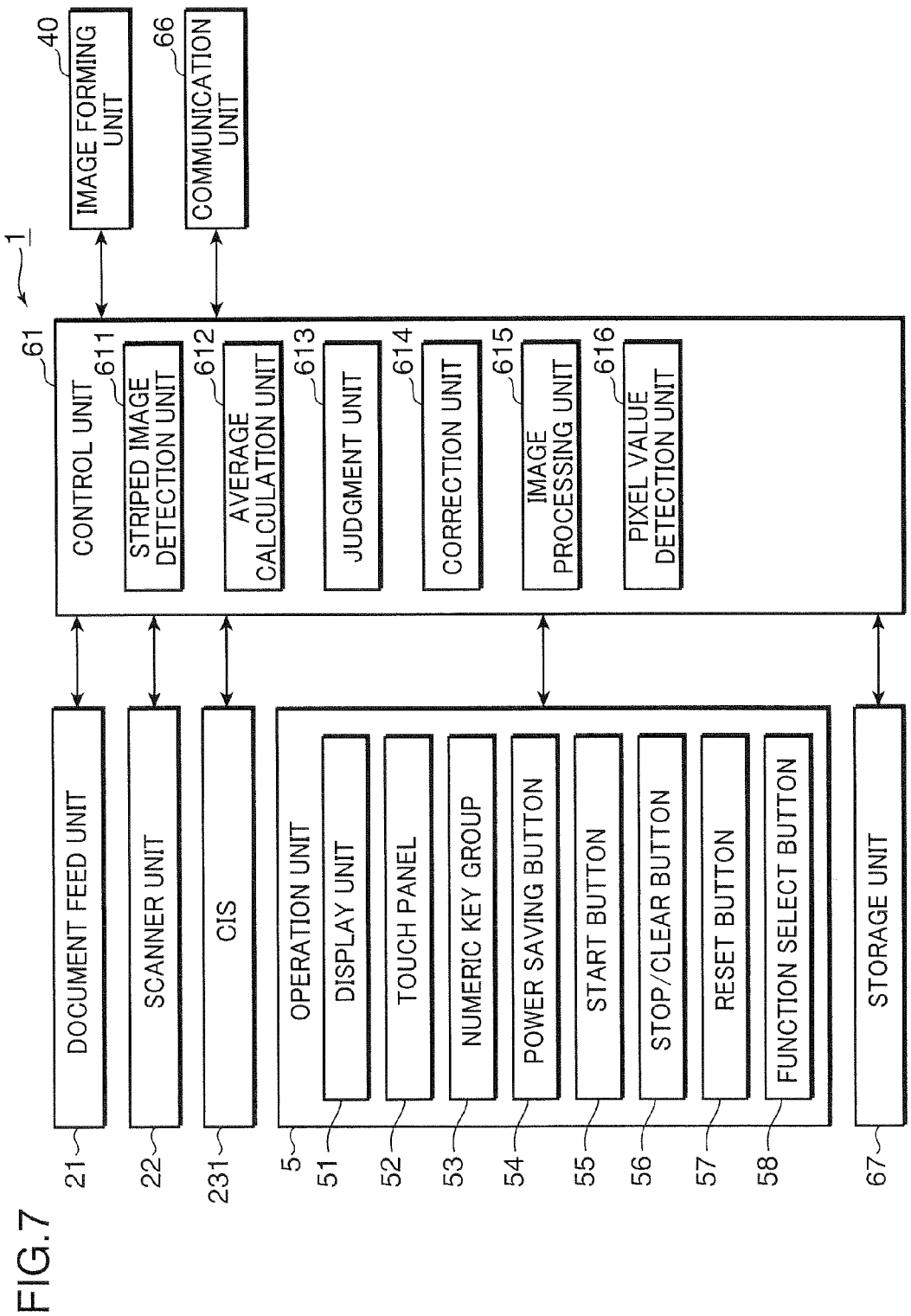
FIG. 7 is a diagram depicting the variant form.

In this case, as FIG. 7 shows, the control unit 61 further has a pixel value detection unit 616. The pixel value detection unit 616 detects an area constituting the halftone image from the image of the document read by the scanner unit 22, and a pixel value of each pixel constituting the halftone image is detected.

As the abovementioned first correction processing, the correction unit 614 judges whether a pixel value of each pixel which constitutes the document read image by the scanner unit 22 and is located in an area corresponding to the striped image is smaller than the average calculated by the average calculation unit 612, and whether a predetermined peripheral pixel (for example, a pixel which is close in the main scanning direction) of a pixel in an area corresponding to the striped image is a pixel constituting a halftone image.

If the correction unit 614 judges that a pixel value of a pixel that constitutes the document read image by the scanner unit 22 and is located in an area corresponding to the striped image is smaller than the average calculated by the average calculation unit 612, and a pixel value of a pixel constituting a halftone image is detected in a predetermined peripheral pixel of the pixel located in the area corresponding to the striped image by the pixel value detection unit 616, the correction unit 614 (1) changes the pixel value of the pixel satisfying the above two conditions into the pixel value detected by the pixel value detection unit 616 or (2) adds a correction value to the pixel value of the pixel satisfying the above two conditions. The correction value is adapted to make the pixel value of a pixel which constitutes the document read image by the scanner unit 22 and which is located in an area corresponding to the striped image, and of which the peripheral pixel does not constitute a halftone image (e.g. pixel Z in FIG. 6B), be the pixel value corresponding to white for a pixel located in the area corresponding to the striped image.

In this case, for a pixel which constitutes the document read image by the scanner unit 22, and is located in the area corresponding to the striped image, and of which peripheral pixel does not constitute the halftone image, the correction unit 614 performs the abovementioned replacement processing to replace the pixel value using the pixel value of the peripheral pixel with a predetermined pixel value for the replacement processing (step #7).

In the above embodiment, the judgment reference values $D_L$ and $D_H$ are fixed values, but the judgment unit 613 may change the judgment reference values $D_L$ and $D_H$ according to the average of the pixel value of each pixel constituting the halftone image acquired by the pixel value detection unit 616.

For example, if the pixel value of the halftone image is smaller than a predetermined value, the judgment unit 613 sets relatively small values for the judgment reference value $D_L$ and judgment reference value $D_H$, and if the pixel value of this halftone image is relatively large, the judgment unit 613 sets relatively large values for the judgment reference value $D_L$ and judgment reference value $D_H$.

By this, the judgment unit 613 can appropriately judge whether information on the image formed on the document appears in a pixel of the image located in an area corresponding to the striped image, compared with the case of using fixed values for the judgment reference values $D_L$ and $D_H$, and as a result, the pixel value of the pixel of the image located in the area corresponding to the striped image can be corrected by appropriate correction processing.

Instead of the judgment unit 613 automatically changing the judgment reference values $D_L$ and $D_H$ ($D_L<D_H$) according to the pixel value of each pixel constituting the halftone image, the judgment reference values $D_L$ and $D_H$ ($D_L<D_H$) may be changed based on the judgment reference values $D_L$ and $D_H$ ($D_L<D_H$) which are input by the user operating the operation unit 5.

In the above embodiment, the striped image generated due to foreign substances adhering to the reading window 230 is targeted, and the requirement of the replacement processing for the image acquired in the read operation by the scanner unit 22 is judged, but a processing similar to the above embodiment may also be performed on the image acquired in the read operation by the CIS 231, since a striped image (white striped image) may be generated for the image acquired in the read operation by the CIS 231.

In summary, the present invention is an image reader comprising: a document transport unit which transports a document; a reading unit which executes read operation in a main-scanning direction at a predetermined reading position, and is capable of reading an image of a document which passes the reading position in a sub-scanning direction during transportation by the document transport unit; a striped image detection unit which detects a striped image generated by a presence of foreign substances adhering to the reading position, based on the image acquired in the reading operation by the reading unit; an average calculation unit which calculates an average of pixel values of pixels constituting the image of the document read by the reading unit, the pixels being in positions corresponding to the striped image detected by the striped image detection unit; a judgment unit which judges whether the average calculated by the average calculation unit is in a predetermined range; and a correction unit which performs a first correction processing to replace a pixel value of each pixel that constitutes the read image of the document by the reading unit and that is located at a position corresponding to the striped image, with a pixel value determined by a pixel value of a pixel around the pixel or with a predetermined pixel value, when the judgment unit judges that the average is outside the predetermined range, and performs a second correction processing to correct a pixel value of each pixel that constitutes the read image of the document by the reading unit and is located at a position corresponding to the striped image by using the pixel value of the pixel, when the judgment unit judges that the average is within the predetermined range.

The present invention is also the image reader, wherein based on the image which the reading unit has read from documents transported through the reading position by the document transport unit, the striped image detection unit detects an image constituted by pixels having pixel values smaller than a predetermined threshold in the image as the striped image, and the average calculation unit calculates an average of pixel values of pixels that constitutes the image of the document read by the reading unit and are at a position in the main-scanning direction in which the striped image detected by the striped image detection unit is formed.

According to these aspects of the invention, if read operation for the document is executed by the reading unit, the striped image detection unit detects whether a striped image generated due to foreign substances adhering to the reading position exist in the image acquired in the read operation. If the striped image detection unit detects the striped image, the average calculation unit calculates the average of pixels that constitute the image of the document read by the reading unit and are located in positions corresponding to the striped image detected by the striped image detection unit, and the judgment unit judges whether the average value is in a predetermined range.

If the judgment unit judges that the average value is outside the predetermined range, the correction unit performs the first correction processing to replace a pixel value of each pixel that constitutes the read image of the document by the reading unit and is located in a position corresponding to the striped image, with a pixel value determined by the pixel value of a pixel located in a peripheral area of the pixel or a predetermined pixel value. If the judgment unit judges that the average is within a predetermined range, on the other hand, the correction unit performs the second correction processing to correct a pixel value of each pixel that constitutes the read image of the document by the reading unit and is located in a position corresponding to the striped image using the pixel value of this pixel.

As described above, in the case when it is judged that the average is in a predetermined range, it is highly probable that the image formed on the document appears in an image located in an area corresponding to the striped image in the document image (reflects information on the image formed on the document), so based on this, the second correction processing is performed on the pixel values of each pixel that constitutes the read image of the document by the reading unit and is located in a position corresponding to the striped image, using the pixel value of this pixel, therefore damaging the quality of the image by performing the first correction processing, ignoring the appearance of an image formed on the document in an area corresponding to the striped image in the document read image, as in the case of prior art, can be prevented. Thereby, according to the present invention, a read image in which the striped image is removed or obscured can be acquired while utilizing the information of the image formed on the document as much as possible.

In other words, except for the characteristics of the striped image to be generated being different and the density of the striped image becoming extremely high or extremely low, depending on the size of the foreign substances to be the cause of the striped image, the document image (image information) more or less appears in the area of the striped image, but if processing to replace the striped image with the image using the image of peripheral pixels is used indiscriminately, as in the case of prior art, the quality of the image may be rather damaged, but according to the present invention, the possibility of a drop in image quality due to this replacement processing can be diminished.

If the judgment unit judges that the average is outside the predetermined range, the probability of the information of the image formed on the document appearing in the document read image located in an area corresponding to the position of the striped image is none or low, so based on this, the correction unit performs the first correction processing to replace the pixel value of each pixel which outputs this striped image is replaced with a pixel value determined from the pixel value of the pixel located in the peripheral are of this pixel, or with a predetermined pixel value, therefore the striped image can be removed or obscured.

The present invention is also an image reader, wherein the second correction processing maintains a pixel value of a pixel that constitutes the read image of the document by the reading unit and is at a position in the main-scanning direction in which the striped image is formed.

According to this aspect of the present invention, if the judgment unit judges that the average is in the predetermined range, the pixel value of the pixel that constitutes the read image of the document by the reading unit and is located at a position corresponding to the striped image is maintained, so damaging the quality of the image by performing the first correction processing, ignoring the appearance of the information on the image formed on the document in the document, in the image located in the position corresponding to the striped image in the document read image, as in the case of prior art, can be prevented.

The present invention is also an image reader, wherein the second correction processing uses a pixel value calculated from a pixel value of a pixel that constitutes the read image of the document by the reading unit and is at a position in the main-scanning direction in which the striped image is formed, using a predetermined correction expression.

According to this aspect of the present invention, if the judgment unit judges that the average is in the predetermined range, the pixel value after correction is calculated by the pixel value of a pixel that constitutes the read image of the document by the reading unit and is located in a position corresponding to the striped image, using a predetermined correction expression, so damaging the quality of the image by performing the first correction processing, ignoring the appearance of the information on the image formed on the document in the document image, in the image of an area located in the position corresponding to the striped image, as in the case of prior art, can be prevented.

The present invention is also an image reader, further comprising a pixel value detection unit which detects a pixel value of a pixel constituting a half tone image out of a read image of the document by the reading unit, wherein the judgment unit sets the predetermined range according to the pixel value detected by the pixel value detection unit.

According to this aspect of the present invention, if the pixel value of the halftone image is relatively small, for example, the upper limit value to specify the predetermined range is set to be a relatively small value, and if the pixel value of the halftone image is relatively large, the upper limit value to specify the predetermined range is set to be a relatively large value, thereby according to the actual state of the image formed on the document, a read image in which the striped image is removed or obscured can be acquired while utilizing the information of the image formed on the document more appropriately.

The present invention is also an image reader, further comprising a pixel value detection unit which detects a pixel value of a pixel constituting a half tone image out of read images of the document by the reading unit, wherein as the first correction processing, when a pixel value of a pixel that constitutes a read image of the document by the reading unit and is at a position in a main-scanning direction in which the striped image is formed indicates a value smaller than the average calculated by the average calculation unit, and the pixel value of the pixel constituting the half tone image is detected in a predetermined peripheral pixel by the pixel value detection unit, the correction unit changes a pixel value of a pixel that is at a position in the main-scanning direction in which the striped image is formed and satisfies the conditions, to a pixel value which indicates the pixel value detected by the pixel value detection unit.

According to this aspect of the present invention, a read image in which the striped image is removed or obscured can be acquired while utilizing the information of the image formed on the document more appropriately as much as possible.

The present invention is also an image forming device comprising one of the above image readers, and an image forming unit which forms an image being output from the image reader on a recording medium.

This application is based on Japanese Patent application serial No. 2008-201792 filed in Japan Patent Office on Aug. 5, 2008, and No. 2009-176237 filed in Japan Patent Office on Jul. 29, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reader, comprising:
a document transport unit which transports a document;
a reading unit which executes a read operation in a main-scanning direction at a predetermined reading position, and is capable of reading an image of a document which passes the reading position in a sub-scanning direction during transportation by the document transport unit;
a striped image detection unit which detects a striped image generated by a presence of a foreign substance adhering to the reading position, based on an image that the reading unit has read in a predetermined position between documents transported through the reading position by the document transport unit;
an average calculation unit which calculates an average of pixel values of pixels constituting the image of the document read by the reading unit, the pixels being in positions corresponding to the striped image detected by the striped image detection unit;
a judgment unit which judges whether the average calculated by the average calculation unit is in a predetermined range; and
a correction unit which performs a first correction processing to replace a pixel value of each pixel that constitutes the read image of the document by the reading unit and that is located at a position corresponding to the striped image, with a pixel value determined by a pixel value of a pixel around the pixel or with a predetermined pixel value, when the judgment unit judges that the average is outside the predetermined range, and performs a second correction processing to correct a pixel value of each pixel that constitutes the read image of the document by the reading unit and is located at a position corresponding to the striped image by using the pixel value of the pixel, when the judgment unit judges that the average is within the predetermined range.

2. The image reader according to claim 1, wherein
based on the image between the documents transported through the reading position, the striped image detection unit detects an image constituted by pixels having pixel values smaller than a predetermined threshold in the image as the striped image, and
the average calculation unit calculates an average of pixel values of pixels that constitutes the image of the document read by the reading unit and are at a position in the main-scanning direction in which the striped image detected by the striped image detection unit is formed.

3. The image reader according to claim 1, wherein the second correction processing maintains a pixel value of a pixel that constitutes the read image of the document by the reading unit and is at a position in the main-scanning direction in which the striped image is formed.

4. The image reader according to claim 1, wherein the second correction processing uses a pixel value calculated from a pixel value of a pixel that constitutes the read image of the document by the reading unit and is at a position in the main-scanning direction in which the striped image is formed, using a predetermined correction expression.

5. The image reader according to claim 1, further comprising a pixel value detection unit which detects a pixel value of a pixel constituting a half tone image out of read images of the document by the reading unit, wherein
the judgment unit sets the predetermined range according to the pixel value detected by the pixel value detection unit.

6. The image reader according to claim 1, further comprising a pixel value detection unit which detects a pixel value of a pixel constituting a half tone image out of read images of the document by the reading unit, wherein as the first correction processing, when a pixel value of a pixel that constitutes a read image of the document by the reading unit and is at a position in a main-scanning direction in which the striped image is formed indicates a value smaller than the average calculated by the average calculation unit, and the pixel value of the pixel constituting the half tone image is detected in a predetermined peripheral pixel by the pixel value detection unit, the correction unit changes a pixel value of a pixel that is at a position in the main-scanning direction in which the striped image is formed and satisfies the conditions, to a pixel value which indicates the pixel value detected by the pixel value detection unit.

7. An image forming device comprising: the image reader according to claim 1; and an image forming unit which forms an image to be output from the image reader on a recording medium.

* * * * *